(12) United States Patent
Xu et al.

(10) Patent No.: US 8,344,882 B2
(45) Date of Patent: Jan. 1, 2013

(54) DISPLAY DEVICE WITH ALARM FUNCTION

(75) Inventors: Feng Xu, Shenzhen (CN); Yong-Qian Deng, Shenzhen (CN)

(73) Assignees: Hong Fu Jin Precision Industry (ShenZhen) Co., Ltd., Shenzhen (CN); Hon Hai Precision Co., Ltd., New Taipei (TW)

( * ) Notice: Subject to any disclaimer, the term of this patent is extended or adjusted under 35 U.S.C. 154(b) by 414 days.

(21) Appl. No.: 12/825,556

(22) Filed: Jun. 29, 2010

(65) Prior Publication Data

US 2011/0279267 A1    Nov. 17, 2011

(30) Foreign Application Priority Data

May 11, 2010    (CN) .......................... 2010 1 0168801

(51) Int. Cl.
*G08B 21/00*    (2006.01)

(52) U.S. Cl. ............... 340/540; 340/309.16; 340/309.2; 340/309.3; 340/309.4; 340/309.5; 368/109

(58) Field of Classification Search .................. 340/540, 340/309.16, 309.2, 309.3, 309.4, 309.5; 368/31, 368/33, 107, 108, 109
See application file for complete search history.

(56) References Cited

U.S. PATENT DOCUMENTS

| | | | | |
|---|---|---|---|---|
| 3,875,741 A | * | 4/1975 | Hastings | 368/96 |
| 4,280,209 A | * | 7/1981 | Mooney | 368/71 |
| 5,309,413 A | * | 5/1994 | Chan | 368/63 |
| 5,881,029 A | * | 3/1999 | Kuo | 368/262 |
| 2010/0195447 A1 | * | 8/2010 | George | 368/13 |

* cited by examiner

*Primary Examiner* — Hai Phan
*Assistant Examiner* — Ojiako Nwugo
(74) *Attorney, Agent, or Firm* — Altis Law Group, Inc.

(57) ABSTRACT

A display device includes a dial, an alarm setting member, and a warning unit. The alarm setting member includes an A/D converter, a recognition module, a storage module, and an analysis module. With rotation of the dial, a variation voltage is generated. The A/D converter converts variable voltage from analog to digital form. In contrast, the alarm time is decreased. The storage module stores the adjusted alarm time. The analysis module compares the current time with the preset alarm time and outputs a driving signal to the warning unit in the event of a match.

20 Claims, 2 Drawing Sheets

DISPLAY DEVICE WITH ALARM FUNCTION

BACKGROUNDS

1. Technical Field

The present disclosure generally relates to display devices and, particularly, to a display device with alarm function.

2. Description of Related Art

Reminders of important appointments during a workday are often provided by a mobile phone or other portable device. However, the device may be turned off or may not be present with the user, such that the reminder fails to be issued.

Therefore, it is desirable to provide a display device with alarm function which can overcome the limitations described.

BRIEF DESCRIPTION OF THE DRAWINGS

Many aspects of the present display device with alarm function can be better understood with reference to the accompanying drawings. The components in the drawings are not necessarily drawn to scale, the emphasis instead being placed upon clearly illustrating the principles of the present display device with alarm function. Moreover, in the drawings, like reference numerals designate corresponding parts throughout the several views, and all the views are schematic.

DETAILED DESCRIPTION

Embodiments of the disclosure are now described in detail with reference to the drawings.

Figure 1:
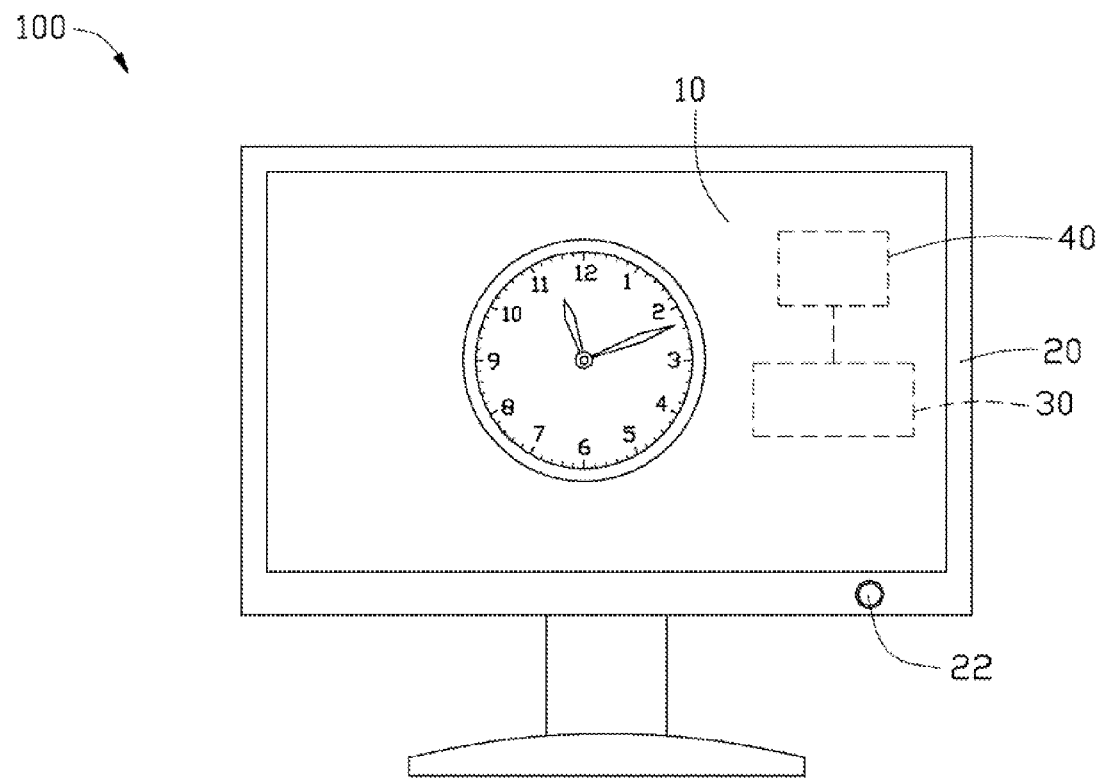
FIG. 1 is a schematic view of a display device according to one embodiment.
Figure 2:
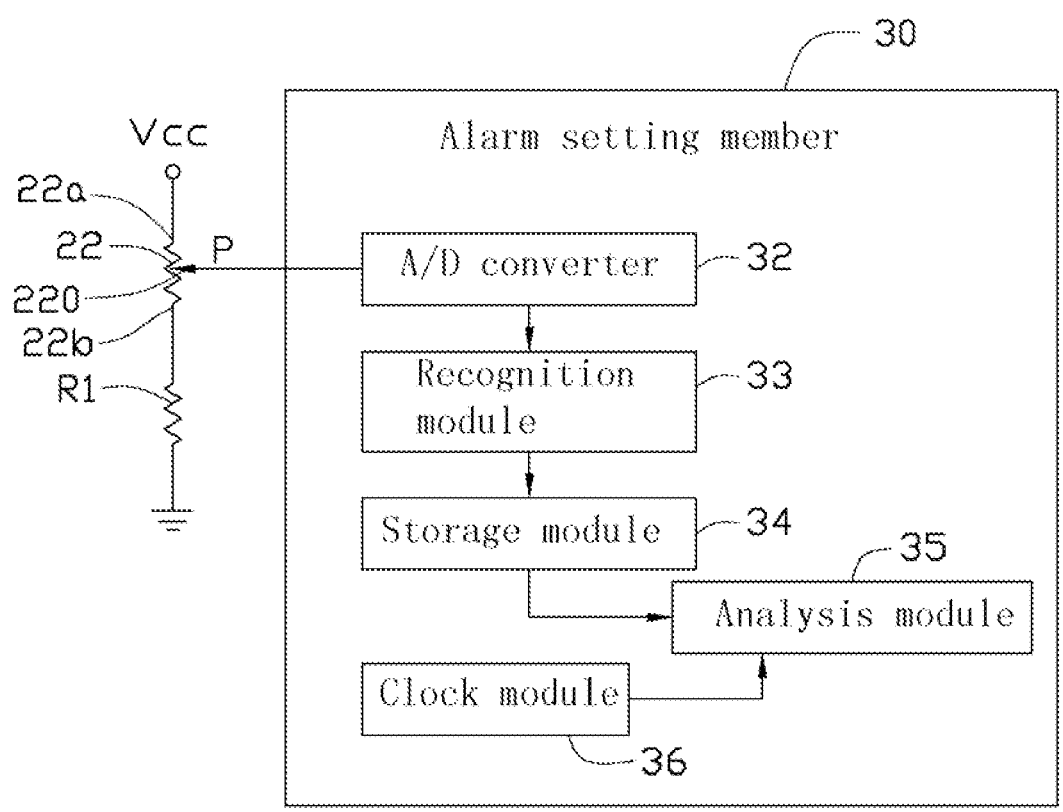
FIG. 2 is a functional block diagram of an alarm setting member of the display device of FIG. 1.

Referring to FIGS. 1 and 2, a display device 100, according to one embodiment, includes a display panel 10, a bezel 20, an alarm setting member 30, and a warning unit 40. The display panel 10 is framed by the bezel 20. The display device 100 is connected to a computer host (not shown) to read information and display the information as a graphical user interface (GUI) of the computer host. In the present embodiment, the display device 100 is a liquid crystal display (LCD).

A dial 22 can be mounted to a front surface of the bezel 20, such as at a right bottom corner thereof, and extend out of the bezel 20 providing manual access thereto. It should be noted that, in other embodiments, the dial 22 can be mounted to another area of the bezel 20. In the present embodiment, the dial 22 is a rotary potentiometer and includes a first end 22a, a second end 22b, and an output 220. The first end 22a of the dial 22 is electrically coupled to a power supply VCC, and the second end 22b is grounded via a resistor R1. The output 220 of the dial 22 is electrically coupled to the alarm setting member 30.

In the present embodiment, the alarm setting member 30 is integrated into a central processing unit (not shown) of the display device 100. The alarm setting member 30 includes an analog-digital (A/D) converter 32, a recognition module 33, a storage module 34, and an analysis module 35.

The A/D converter 32 is electrically coupled to the output 220 of the dial 22. As the dial 22 is rotated, a voltage of the output 220 varies to a set voltage. The A/D converter 22 is configured for converting a set voltage from an analog form into a digital form and transmitting the voltage to the recognition module 33. In the present embodiment, when the dial 22 is rotated counterclockwise, the resistance value between the output 220 and the first end 22b decreases. Accordingly, the voltage of the output 220 is set to a higher value. In contrast, when the dial 22 is rotated clockwise, the resistance value between the output 220 and the first end 22a increases. As consequence, the voltage is set to a lower value.

The recognition module 33 is electrically coupled to the A/D converter 32. When the recognition module 33 recognizes the increased voltage output from the dial 22, the recognition module 33 can correspondingly increase the alarm time and decrease the alarm time. Furthermore, the recognition module 33 can adjust the hour hand and the minute hand depending on the set voltage output by the A/D converter 32. In the present embodiment, when the dial 22 is rotated counterclockwise, the output voltage of the dial 22 decreases, the recognition module 33 can recognize the decreased voltage output from the dial 22 and simultaneously adjust the corresponding hour hand to increase the alarm time. When the dial 22 is rotated clockwise, the recognition module 33 can recognize the decreased voltage output from the dial 22 and simultaneously adjust the corresponding minute hand to decrease the alarm time. The adjustment described is immediately displayed on the display panel 10.

It should be noted that adjustment of the hour hand and the minute hand by the recognition module 33 is not limited to the manner described, but can vary based on requirements. In another embodiment, when the dial 22 is rotated counterclockwise, the output voltage of the dial 22 correspondingly decreases, the recognition module 33 can simultaneously adjust the corresponding minute hand to increase the alarm time, and when the dial 22 is rotated clockwise, the output voltage of the dial 22 correspondingly increases, the recognition module 33 can simultaneously adjust the corresponding hour hand to decrease the alarm time.

In the present embodiment, the storage module 34 is an electrically erasable memory, which is configured to store the adjusted alarm time adjusted by the dial 22.

The analysis module 35 is configured for comparing the current time with the preset alarm time stored by the storage module 34 and, in the event of a match, outputting a drive signal to the warning unit 40. The alarm setting member 30 can further includes a clock module 36 configured for recording and displaying the current time.

The warning unit 40 is electrically coupled to the analysis module 35. When the warning unit 40 receives the drive signal transmitted by the analysis module 35, the warning unit 40 outputs a triggering signal to flicker the display panel 10. It should be noted that the display device 100 can also include a loudspeaker, through which the warning unit 40 outputs an audio alarm signal to emit sound.

It will be understood that the embodiments are shown and described by way of illustration only. The principles and the features of the disclosure may be employed in various and numerous embodiments thereof without departing from the scope as claimed. The embodiments disclosed illustrate the scope, but do not restrict the scope of the disclosure.

What is claimed is:

1. A display device connected to a computer host for displaying a graphical user interface of the computer host, the display device comprising:

a bezel;

a display panel framed by the bezel;

a dial mounted on the bezel, and comprising a first end coupled to a power supply, a second grounded end, and an output; and an alarm setting member comprising an analog-digital (A/D) converter coupled to the output of the dial, a recognition module, a storage module, and an analysis module, wherein a voltage varies to a set voltage in accordance with rotation of the dial, the A/D converter converts a set voltage from an analog form into a digital form and transmits the converted voltage to the recognition module; when the recognition module recognizes an increased voltage output from the dial, an alarm time is correspondingly increased by the recognition module, and when the recognition module recognizes a decreased voltage output the alarm time will be correspondingly decreased; the storage module stores the adjusted alarm time; the analysis module compares a current time with a preset alarm time and outputting a drive signal to a warning unit in the event of a match.

2. The display device of claim 1, wherein adjustment of an hour hand and a minute hand by the recognition module depends on the variation voltage output by the A/D converter.

3. The display device of claim 2, wherein when the output voltage of the dial decreases, the recognition module recognizes the decreased voltage output from the dial and simultaneously adjusts the corresponding hour hand to decrease the alarm time; the recognition module recognizes that the dial adjusts the minute hand and simultaneously adjusts the corresponding minute hand to decrease the alarm time.

4. The display device of claim 2, wherein when the output voltage of the dial decreases, the recognition module simultaneously adjusts the corresponding minute hand to decrease the alarm time; the recognition module simultaneously adjusts the corresponding hour hand to decrease the alarm time.

5. The display device of claim 1, wherein the adjustment of the alarm time is immediately shown on the display panel.

6. The display device of claim 1, further comprising a resistor, wherein the second end of the dial is grounded via the resistor.

7. The display device of claim 1, wherein the dial is a rotary potentiometer.

8. The display device of claim 1, wherein the dial is rotatably mounted at the right bottom corner of the bezel.

9. The display device of claim 1, wherein the display device is a liquid crystal display (LCD).

10. The display device of claim 7, wherein when the dial is rotated counterclockwise, a resistance value of the potentiometer between a first output and the first end decreases, and when the dial is rotated clockwise, the resistance value between the output and the first end increases.

11. The display device of claim 1, wherein when the warning unit receives the drive signal outputted by the analysis module, the warning unit outputs a triggering signal to flicker the display panel.

12. A display device connected to a computer host for displaying a graphical user interface of the computer host, the display device comprising:
a bezel;
a display panel framed by the bezel;
a dial mounted on the bezel, and comprising a first end coupled to a power supply, a second grounded end, and an output; and
an alarm setting member comprising an analog-digital (A/D) converter coupled to the output of the dial, a recognition module, a storage module, an analysis module and a clock module recording and displaying a current time, wherein a voltage varies to a set voltage in accordance with rotation of the dial, the A/D converter converts a set voltage from an analog form into a digital form and transmits the converted voltage to the recognition module; when the recognition module recognizes an increased voltage output from the dial, an alarm time is correspondingly increased by the recognition module, and when the recognition module recognizes a decreased voltage output the alarm time will be correspondingly decreased; the storage module stores the adjusted alarm time; the analysis module compares the current time recorded and displayed by the clock module with a preset alarm time and outputting a drive signal to the warning unit in the event of a match.

13. The display device of claim 12, wherein adjustment of an hour and a minuted hand of the alarm time by the recognition module depends on the variation voltage output by the A/D converter.

14. The display device of claim 13, wherein when the output voltage of the dial decreases, the recognition module recognizes the decreased voltage output from the dial and simultaneously adjusts the corresponding hour hand to decrease the alarm time; the recognition module recognizes that the dial adjusts the minute hand and simultaneously adjusts the corresponding minute hand to decrease the alarm time.

15. The display device of claim 13, wherein when the output voltage of the dial decreases, the recognition module simultaneously adjusts the corresponding minute hand to decrease the alarm time; the recognition module simultaneously adjusts the corresponding hour hand to decrease the alarm time.

16. The display device of claim 12, wherein the adjustment of the alarm time is immediately shown on the display panel.

17. The display device of claim 12, further comprising a resistor, wherein the second end of the dial is grounded via the resistor.

18. The display device of claim 12, wherein the dial is a rotary potentiometer.

19. The display device of claim 18, wherein when the dial is rotated counterclockwise, a resistance value of the potentiometer between a first output and a first end decreases, and when the dial is rotated clockwise, the resistance value between the output and the first end increases.

20. The display device of claim 12, wherein when the warning unit receives the drive signal outputted by the analysis module, the warning unit outputs a triggering signal to flicker the display panel.

* * * * *